(12) United States Patent
Knappe et al.

(10) Patent No.: US 6,668,677 B2
(45) Date of Patent: Dec. 30, 2003

(54) CEILING MOUNT ASSEMBLY

(75) Inventors: Stefan Knappe, Huenfeld-Michelsrombach (DE); Manfred Braehler, Grossenlueder (DE)

(73) Assignee: Wella Aktiengesellschaft, Darmstadt (DE)

( * ) Notice: Subject to any disclaimer, the term of this patent is extended or adjusted under 35 U.S.C. 154(b) by 38 days.

(21) Appl. No.: 09/990,519

(22) Filed: Nov. 21, 2001

(65) Prior Publication Data
US 2002/0059846 A1 May 23, 2002

(30) Foreign Application Priority Data
Nov. 22, 2000 (DE) .......................................... 100 58 123

(51) Int. Cl.[7] ................................................ B25J 17/00
(52) U.S. Cl. ................................ 74/490.01; 74/490.05; 414/680
(58) Field of Search .................. 74/490.01, 490.03, 74/490.05, 479.01; 414/680, 718; 212/253, 260

(56) References Cited

U.S. PATENT DOCUMENTS

| | | | | |
|---|---|---|---|---|
| 4,215,972 A | * | 8/1980 | Yamasaki et al. | 414/742 |
| 4,364,707 A | * | 12/1982 | Ott | 414/744 B |
| 4,652,204 A | * | 3/1987 | Arnett | 414/751 |
| 4,664,873 A | * | 5/1987 | Hendrich et al. | 376/260 |
| 4,759,674 A | * | 7/1988 | Schroder et al. | 414/146 |
| 4,912,754 A | * | 3/1990 | Van Steenburg | 378/209 |
| 5,099,707 A | * | 3/1992 | Tori et al. | 74/89.15 |
| 5,265,195 A | * | 11/1993 | Jinno et al. | 395/96 |
| 5,555,897 A | * | 9/1996 | Lathrop, Jr. et al. | 128/845 |
| 5,596,254 A | * | 1/1997 | Vaughn et al. | 74/479.01 |
| 5,881,603 A | * | 3/1999 | Kitamura | 74/490.03 |
| 6,231,526 B1 | * | 5/2001 | Taylor et al. | 600/587 |

FOREIGN PATENT DOCUMENTS

| | | |
|---|---|---|
| DE | 42 17 128 A1 | 11/1993 |
| EP | 0 496 994 A1 | 8/1992 |

* cited by examiner

Primary Examiner—Matthew C. Graham
Assistant Examiner—Mariano Sy
(74) Attorney, Agent, or Firm—Michael J. Striker

(57) ABSTRACT

A ceiling mount assembly for moving and positioning of objects in a space has a ceiling mounting device, a rotary bearing part, a turning arm mounted on the rotary bearing part for vertical movements around a main axis near a vertical rotary axis of the rotary bearing part, a threaded spindle drive which is driven by an electric motor and providing the vertical movements of the turning arm about the main axis, and a load part at an end of the turning arm for carrying objects, and the electric motor being provided with a worm gear transmission and the electric motor, the worm gear transmission and the threaded spindle drive being stationarily connected with one another, the threaded spindle drive being arranged parallel to the vertical rotary axis of the rotary bearing part while the electric motor is arranged horizontally to the vertical rotary axis, a vertical drive for driving the turning arm about the main axis, formed by a threaded spindle nut and a cardan connection, and a telescopic arm connection provided between the cardan connection and an initial portion of the turning arm.

6 Claims, 4 Drawing Sheets

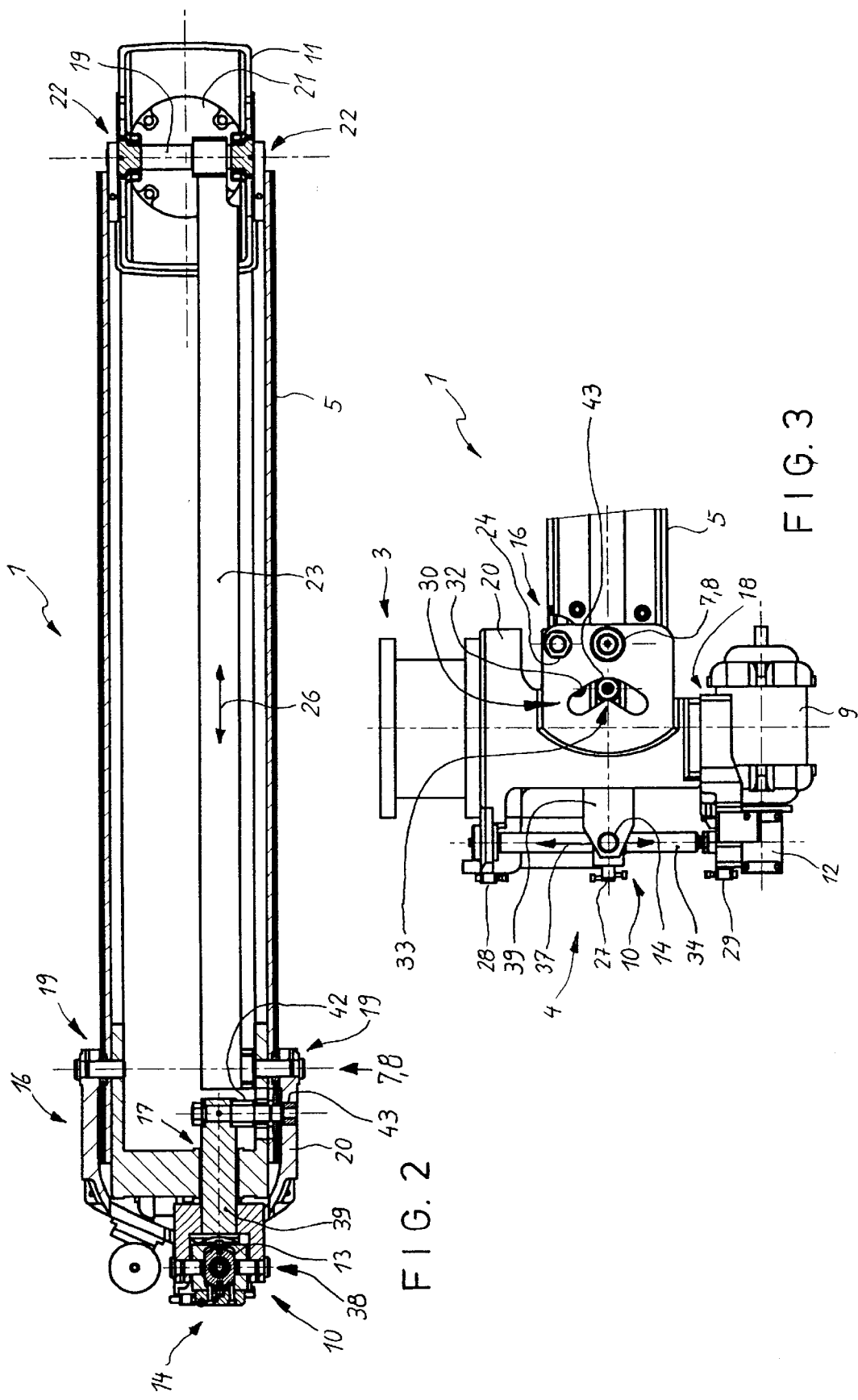

CEILING MOUNT ASSEMBLY

BACKGROUND OF THE INVENTION

The present invention relates to a ceiling mount assembly.

Ceiling mount assemblies are known in the art. One of such ceiling mount assemblies is disclosed for example in the European patent document EP 0496994 A1. In this ceiling mount assembly, in order to arrange the threaded spindle drive with the electric motor and the transmission so as to form an extension of the turning arm, the electric motor is arranged far outside of the rotary bearing part. Thereby it interferes with a space (it has great lateral structural length) and is difficult to clean or to disinfect. This is especially disadvantageous for the use in medical technology from hygienic reasons. Since the electric motor is turned out during adjustment, a large covering with respect to a large mount structural space is required. Moreover, a gas pressure spring is needed at a second energy carrier which is not only expensive but also, depending to the height, differently susceptible to heat and cold.

SUMMARY OF THE INVENTION

Accordingly, it is an object of present invention to provide a mount assembly, which avoids the disadvantages of the prior art.

In keeping with these objects and with others, which will become apparent hereinafter, one feature of present invention resides, briefly stated, in a ceiling mount assembly, which avoids the disadvantages of the prior art.

In keeping with these objects and with others which will become apparent hereinafter, one feature of present invention resides, briefly stated, in a ceiling mount assembly comprising a ceiling mounting device; a rotary bearing part; a turning arm mounted on the rotary bearing part for vertical movements around a main axis near a vertical rotary axis of the rotary bearing part; a threaded spindle drive which is driven by an electric motor and providing the vertical movements of the turning arm about the main axis; and a load part at an end of the turning arm for carrying objects, electric motor being provided with a worm gear transmission, and the electric motor, the worm gear transmission and the threaded spindle drive being stationarily connected with one another, the threaded spindle drive being arranged parallel to the vertical rotary axis of the turning bearing part while the electric motor is arranged horizontally to the vertical rotary axis; vertical drive for driving the turning arm vertically about the main axis, which is formed by a threaded spindle nut and a cardan connection; and a telescopic arm connection provided between the cardan connection and an initial portion of the turning arm.

When the ceiling mount assembly is designed in accordance with the present invention, it eliminates the disadvantages of the prior art.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 2 is a plan view in a vertical section of the ceiling mount assembly of FIG. 1 in accordance with the present invention;

FIG. 3 is a side partial view of the ceiling mount assembly of FIG. 2 in accordance with the present invention;

DESCRIPTION OF THE PREFERRED EMBODIMENTS

Figure 1:
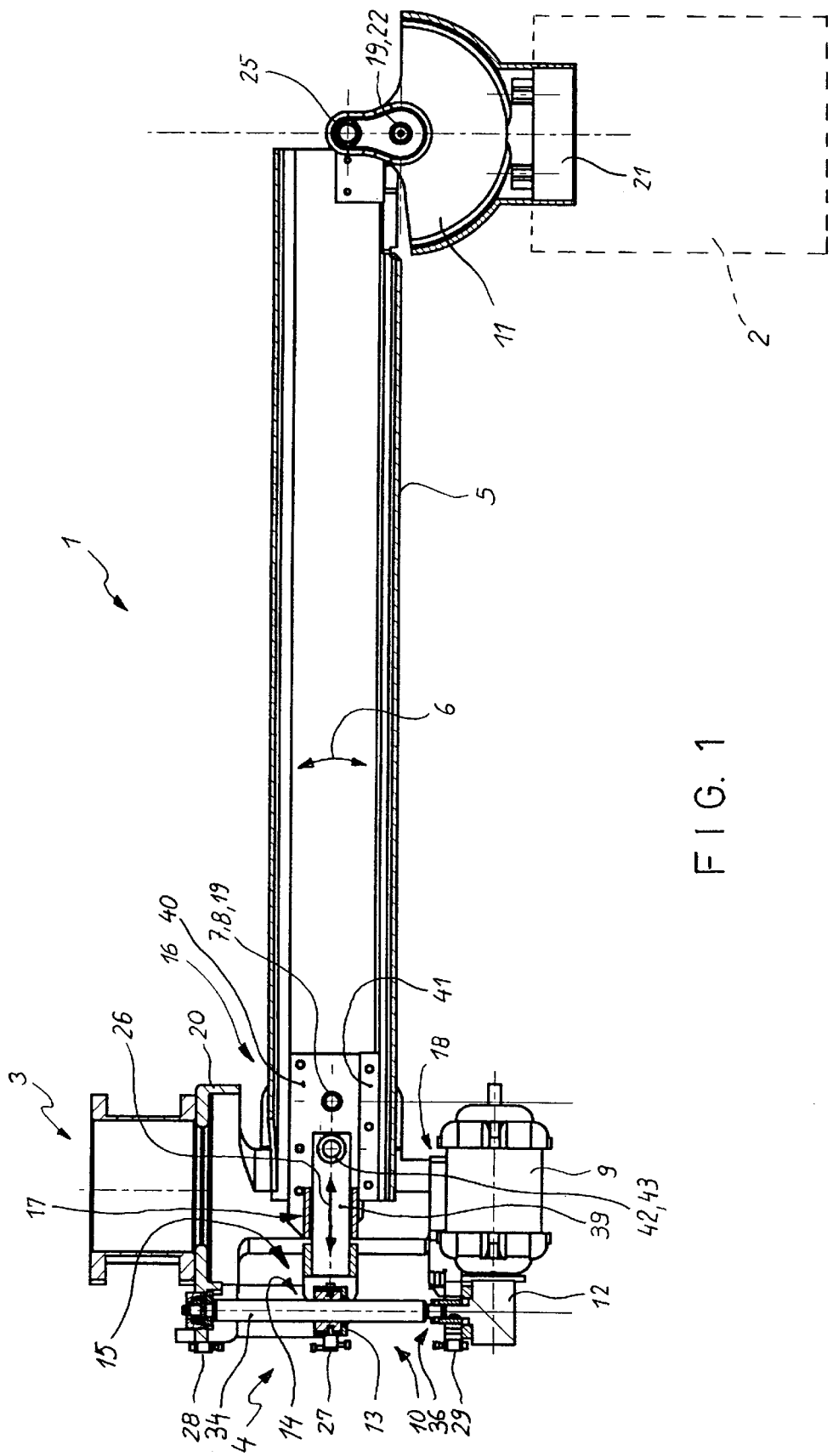
FIG. 1 is a side view of a ceiling mount assembly in accordance with the present invention in a longitudinal section.
Figure 4:
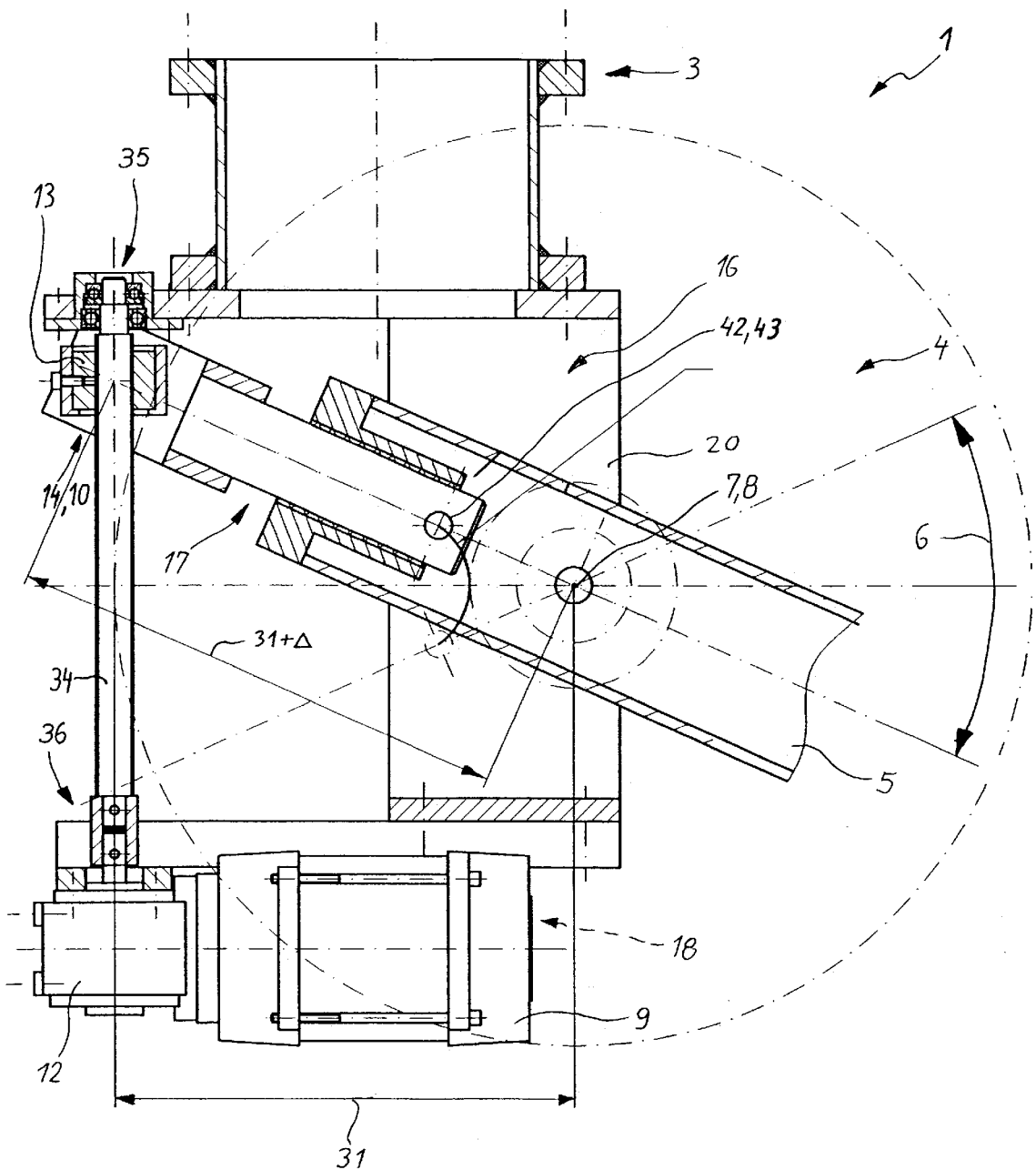
FIG. 4 is a further side partial view of the ceiling mount assembly of FIG. 3 on an enlarged scale.

FIGS. 1–4 show different views of a ceiling mount assembly 1 for moving and positioning of objects in a space. It has a ceiling mounting device 3, a rotary bearing part 4, a turning arm 5 connected to it for a vertical movement 6 around the main axis 7 near a vertical rotary axis 8 of the rotary bearing part 4 by a threaded spindle drive 10 which is driven by an electric motor 9, and a load part 11 at the end of the turning arm 5 for supporting the object 2. The electric motor 9 is provided with a worm gear transmission 12, and the electric motor 9 is removably connected with the worm gear transmission 12 and the threaded spindle drive 10.

The threaded spindle drive 10 or a threaded spindle 35 is arranged parallel to the vertical rotary axis 8 of the rotary bearing part 4, and the electric motor 9 is arranged axially to the rotary axis 8 and horizontally. Thereby a compact drive unit is produced. A threaded spindle nut 13 with a cardan connection 14 forms the vertical drive 15 of the turning arm 5 around a main axis 7. Between the cardan connection 14 and the catching portion 16 of the turning arm 5, a telescopic arm connection 17 is provided. The electric motor 9 is mounted on the rotary bearing part 4 by a screw connection 18. The turning arm 5 is formed of aluminum extruded profile and is mounted by plug axles 19 vertically rotatably about the main axis 7 on the housing 20 of the rotary bearing part 4.

A head packing part 21 is vertically rotatably mounted on the load part 11 of the turning arm 5. The mounting of the load part 11 is performed by a plug axle 19 and corresponding bearing parts 22. In order to guarantee that during the vertical turning movement 6 the head packing part 21 remains oriented horizontally, a parallel guiding rod 23 is mounted. It is rotatably fixed on the housing 20 by a mounting pin 24 and on the head packing part 21 by a further plug axle 25. The parallel guiding rod 23 during the vertical turning movement 6 positively performs a linear movement 26. A horizontal fine adjustment of the head packing part 21 is performed by an adjustment of an eccentric on the mounting pin 24 of the parallel guiding rod 23. The vertical turning movement 6 of the turning arm 5 is limited in connection with a driver 27 on the threaded spindle nut 13, by a first end switch 28 in a upper position and by a second end switch 29 in a lower position. The end switch 28, 29 interrupts the current supply of the electric motor 9, and thereby it is stopped.

A cam control device 30 continuously compensates a variable distance 31 between the main axis 7 or the rotary axis 8 and the threaded spindle nut 13. The cam control device 30 is provided with a coulisse cam 32 in the form of a hyperbola.

The stationarily mounted turning drive or the vertical drive 15 includes an electric motor 9 with a worm gear transmission 12 as well as a threaded spindle transmission drive 10. The mounting of the motor-/transmission assembly is performed by a screw connection 18 on the housing 20. A threaded spindle 34 is supported at the upper end axially and radially in form of a fixed bearing 35. Here the threaded spindle forces are taken and transmitted to the housing 20. The rotary movement of the electric motor 9 is transmitted via the worm gear transmission 12 by a coupling 36 to the threaded spindle 34. The conversion of the rotary movement into a linear vertical stroke movement 37 is made possible by the engagement of the threaded spindle nut 13 on the threaded spindle 34.

By the mechanical connection of the threaded spindle nut 13 with the cardan connection 14, the linear stroke movement 37 can be transmitted to the turning arm 5, to make possible the turning movement of the turning arm 5 about the main axis 7. This is performed by the plug pin connection 38 to a fork 39, which is in connection with the turning arm 5 by a connecting fork 40. The connecting fork 40 is mounted with two clamping sleeves 41 form and force-lockingly with the turning arm profile 5. The connection between the fork 39 and the connecting fork 40 is formed as a linear guide, so as to provide for the fork 39 a linear freedom (linear movement 26). Radially, the fork 39 is supported in the connecting fork 40 through a running sleeve 42.

In view of the stationarily mounted threaded spindle drive 10, a linear adjustment of the distance 31 between the threaded spindle 34 and the main axis 7 must be performed during the turning movements 6 of the turning arm 5. This is obtained by the linear movement 26 of the fork 39 and controlled by the cam control device 30 with a running roller 43 or pin guide 33 with the coulisse cam 32. Thereby, the position error of the fork 39 to the threaded spindle 34 during the turning movement 60 is compensated. The running roller 43 transfers the function of the cam control device 30 through the pin guide 33 further to the fork 39. In the fork 39 the threaded spindle nut 13 is mounted so that the nut 13 can run on the threaded spindle 34. For a friction-free running of the threaded spindle drive 10, the high accuracy of the coulisse cam 32 or the pin guide 33 is needed.

The ceiling mounting assembly 1 serves for transportation, positioning and assembly (with current and gas) of medical devices horizontally as well as vertically in a space, and in particular is formed for the application in medical technology. With axial bearing units, the horizontal movement, and with an electric motor 9 with the worm gear transmission 12 as well as threaded spindle transmission 10 the vertical movement 6 or transportation in the space can be performed.

Figure 5:
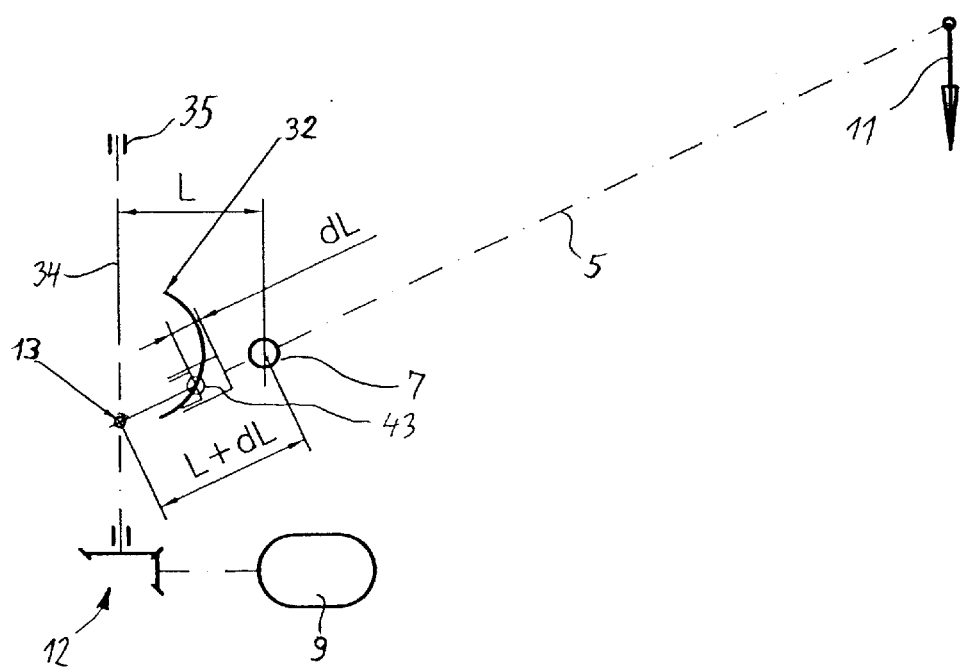
FIGS. 5 and 6 are views showing a principle drawing of a cam control device in accordance with the present invention.
Figure 6:
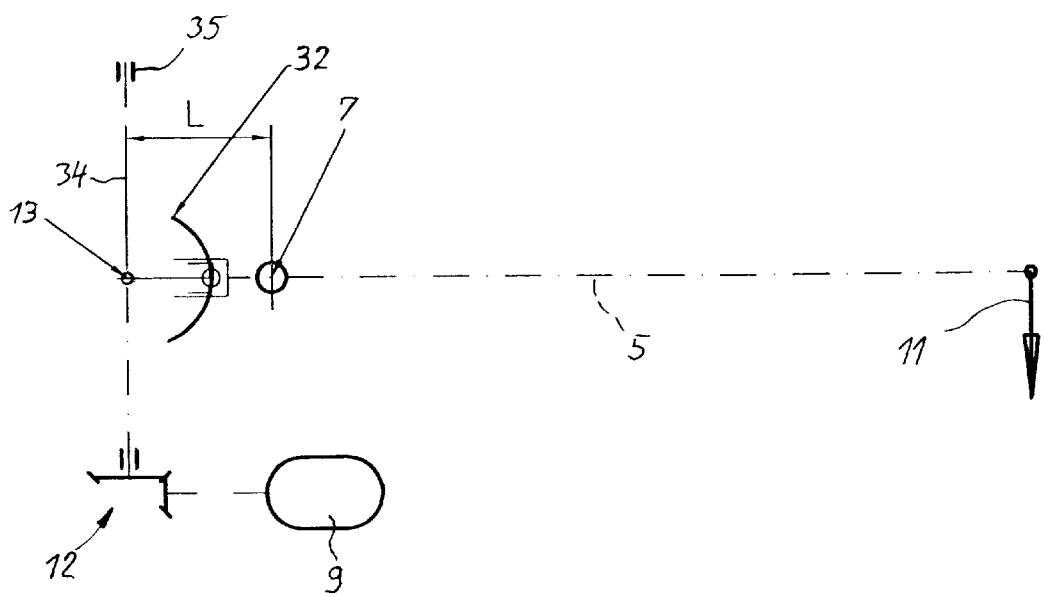

FIGS. 5 and 6 show the principle of the cam control device 30 with a compensation of the variable distance 31 for example L and L+dL. The longitudinal compensation is performed with a coulisse cam 32, to provide a low friction running of the threaded spindle drive 10 or the threaded spindle nut 13. The cam control device 30 includes a running roller 43 which runs on the coulisse cam 32 and this movement is transferred to a linear guide which realizes the corresponding position of the nut 13 to the vertical movement 6.

It will be understood that each of the elements described above, or two or more together, may also find a useful application in other types of constructions differing from the types described above.

While the invention has been illustrated and described as embodied in ceiling mount assembly, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is:

1. A ceiling mount assembly for moving and positioning of objects in a space, said ceiling mount assembly comprising a ceiling mounting device; a rotary bearing part; a turning arm mounted on said rotary bearing part for vertical movements around a main axis near a vertical rotary axis of said rotary bearing part; a threaded spindle drive which is driven by an electric motor and providing the vertical movements of said turning arm about said main axis; and a load part at an end of said turning arm for carrying objects, said electric motor being provided with a worm gear transmission, and said electric motor, said worm gear transmission and said threaded spindle drive being stationarily connected with one another, said threaded spindle drive being arranged parallel to said vertical rotary axis of said rotary bearing part while said electric motor is arranged horizontally to said vertical rotary axis; a vertical drive of for driving said turning arm vertically about said main axis, said vertical drive comprising a threaded spindle nut and a cardan connection; and a telescopic arm connection provided between said cardan connection and an initial portion of said turning arm.

2. A ceiling mount assembly as defined in claim 1; and further comprising a cam control device for compensating a variable distance between said main axis or said rotary axis and said threaded spindle nut.

3. A ceiling mount assembly as defined in claim 2, wherein said cam control device is provided with a coulisse cam in the form of a hyperbola.

4. A ceiling mount assembly as defined in claim 3, wherein said coulisse cam is provided with a pin guide.

5. A ceiling mount assembly as defined in claim 1, wherein said ceiling mount assembly is formed so as to be usable for a medicinal technology.

6. A ceiling mount assembly as defined in claim 1; and further comprising supply conduits guided through the ceiling mount assembly.

* * * * *